United States Patent
Owen, Jr. et al.

[11] Patent Number: 5,204,774
[45] Date of Patent: Apr. 20, 1993

[54] NIGHT VISION GOGGLE WITH IMPROVED OPTICAL SYSTEM

[75] Inventors: R. Calvin Owen, Jr., Lincoln, Mass.; Robert A. Gallagher, Roanoke, Va.; Robert M. Burley, Concord, Mass.

[73] Assignee: Varo Inc., Garland, Tex.

[21] Appl. No.: 803,036

[22] Filed: Dec. 6, 1991

[51] Int. Cl.⁵ .................. G02B 23/00; G02B 13/00
[52] U.S. Cl. .............................. 359/418; 359/409; 359/744; 250/214 VT
[58] Field of Search ............. 359/399, 404, 405, 407, 359/409, 410, 418, 419–421, 708, 721, 744, 480–482, 353–357, 629, 637; 250/213 VT

[56] References Cited

U.S. PATENT DOCUMENTS

| | | | |
|---|---|---|---|
| 3,490,826 | 4/1967 | Kzamaki et al. | 359/764 |
| 3,554,629 | 1/1971 | Takahashi | 359/796 |
| 3,674,330 | 7/1972 | Strong | 359/742 |
| 4,463,252 | 7/1984 | Brennan et al. | 250/213 VT |
| 4,469,396 | 9/1984 | Neil | 359/353 |
| 4,486,069 | 12/1984 | Neil et al. | 359/744 |
| 4,737,023 | 4/1988 | Kastendieck et al. | 359/833 |
| 4,741,608 | 5/1988 | Kastendieck et al. | 359/839 |
| 4,794,246 | 12/1988 | Kastendieck et al. | 250/213 VT |
| 4,820,031 | 4/1989 | Kastendieck et al. | 359/833 |
| 4,838,678 | 6/1989 | Hubertus | 359/375 |
| 4,854,686 | 8/1989 | Oda | 359/747 |
| 4,872,748 | 10/1989 | Braat | 359/708 |
| 4,924,244 | 5/1990 | Kataoka et al. | 359/708 |
| 4,926,201 | 5/1990 | Mukai et al. | 359/708 |
| 4,958,931 | 9/1990 | Tatian | 356/360 |
| 4,963,007 | 10/1990 | Moskovich | 359/708 |
| 5,020,889 | 6/1991 | Mercado et al. | 359/754 |
| 5,072,104 | 12/1991 | Tatian | 359/727 |
| 5,107,371 | 4/1992 | Shibata et al. | 359/642 |

*Primary Examiner*—Bruce Y. Arnold
*Assistant Examiner*—James Phan
*Attorney, Agent, or Firm*—Baker & Botts

[57] ABSTRACT

There is provided an improved night vision goggle having a housing containing an objective lens assembly, an image intensifier tube, a collimator assembly, a splitter member, and a pair of afocal telescopes. The optical axis of the afocal telescopes are offset from the optical axis of the collimator and objective lens assemblies. A pair of achromatic doublet lens assemblies are mounted side-by-side on the exit side of the collimator and near the entrance pupils of the telescopes. The optical axes of the doublet lens assemblies are coaxial with the optical axes of the telescopes. The achromatic doublet lens assemblies thus collect light from a sub-diameter, decentered aperture of the collimator assembly, and correct axial chromatic aberration in the telescopes.

13 Claims, 2 Drawing Sheets

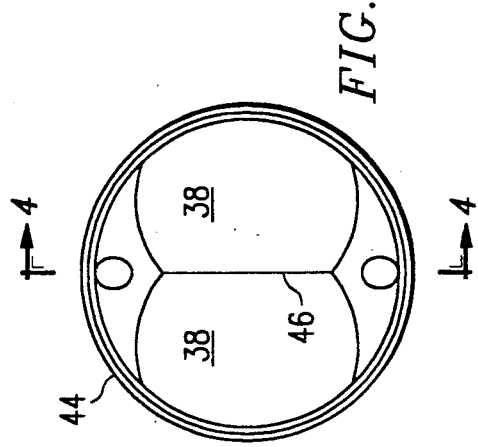
*FIG. 3*
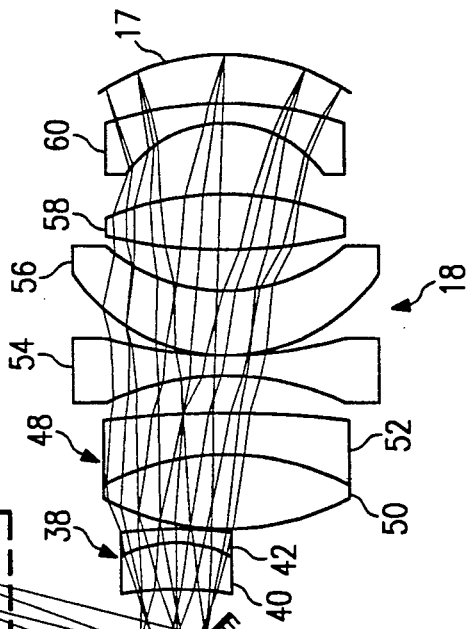
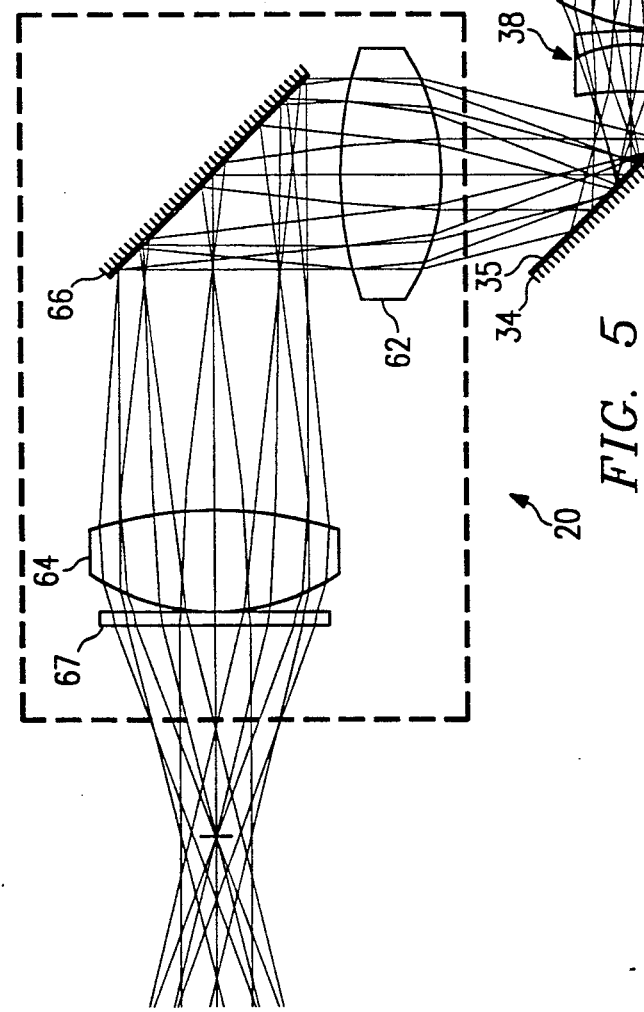
*FIG. 4*
*FIG. 5*

0
NIGHT VISION GOGGLE WITH IMPROVED OPTICAL SYSTEM

TECHNICAL FIELD OF THE INVENTION

The present invention relates to optical systems and, more particularly, to a night vision optical system with improved optics.

BACKGROUND OF THE INVENTION

Night vision goggles are binocular viewers that operate at very low light levels to allow the user to see, move, and work in the dark. The earliest night vision goggles designed for two-eyed operation utilized two complete optical systems: an objective lens assembly, an image intensifier tube, a collimator, and a telescope: one such system for each eye. The high cost of such a completely dual system eventually led to the development of a binocular night vision goggle having a single objective lens assembly, image intensifier tube, and collimator. See U.S. Pat. No. 4,463,252, issued Jul. 31, 1984 to Brennan, et al., for a Night Vision Goggle System; U.S. Pat. No. 4,737,023, issued Apr. 12, 1988 to Kastendieck, et al. for a Binocular Periscope Viewing Device Including Triple Prism For Image Splitting; U.S. Pat. No. 4,820,031, issued Apr. 11, 1989 to Kastendieck, et al. for a Binocular Periscope Viewing Device Including Triple Prism for Image Splitting and Elongate Head Column; U.S. Pat. No. 4,794,246, issued Dec. 27, 1988 to Kastendieck for a Universal Passive Night Vision System; and U.S. Pat. No. 4,741,608, issued May 3, 1988 to Kastendieck, et al. for a Turning Mirror for Integrating Image and Light Indicator Ray Bundles. The night vision goggle system disclosed by Brennan, et al., for example, utilizes an image splitter to reflect the image viewed by the collimator to each of a pair of afocal telescopes, one for each eyepiece of the goggle.

While image splitting techniques have been effective in reducing the cost, weight, and size of night vision goggles, an inherent disadvantage persists with current binocular night vision goggles utilizing image splitters. This is the large amount of axial chromatic aberration in the afocal telescopes of the goggles.

The conventional solution to the chromatic aberration problem is the addition of corrector lenses, typically cemented doublets, to the afocal telescope optics. Modern binocular night vision goggles, however, have greatly simplified afocal telescope optics consisting of only two lenses (an aspheric singlet objective lens and an aspheric singlet eyepiece lens) and a mirror. This design has permitted the use of a compact, lightweight eyepiece which is essential for many night vision goggle purposes. The addition of corrector lenses to the afocal telescopes would require, at a minimum, a pair of lenses or a cemented doublet for both the objective lens and the eyepiece lens. This would unacceptably increase the weight, size, and cost of the telescopes and of the goggle as a whole.

Consequently, a need exists for a binocular night vision goggle with an improved optical system that corrects axial chromatic aberration without the addition of corrector lenses to the afocal telescopes, and without significantly increasing the weight, size, or cost of the goggles.

SUMMARY OF THE INVENTION

The present invention provides an improved night vision goggle comprising a housing, a collimator assembly, a pair of afocal telescopes, a splitter member, an objective lens assembly, an image intensifier tube, and a pair of achromatic doublet lens assemblies. The objective lens assembly, image intensifier tube, and collimator assembly are supported within the housing on a common optical axis. The objective lens assembly transmits an image incident thereon to the image intensifier tube. The collimator assembly views the intensified image produced by the image intensifier tube. The splitter member, mounted within the housing concentrically with the optical axis of the collimator assembly and optically between the collimator assembly and each telescope, reflects the image transmitted by the collimator to each of the afocal telescopes. The afocal telescopes each have an aspheric singlet objective lens, an aspheric singlet eyepiece lens, and a mirror mounted between the objective lens and the eyepiece lens, for transmitting images separately to each eye of a viewer. The optical axes of the telescopes are offset from the optical axis of the collimator and objective lens assemblies. The achromatic doublet lens assemblies are mounted on the exit side of the collimator assembly, and near the entrance pupils of the afocal telescopes. Each doublet lens assembly is a cemented doublet with approximately zero optical power. The doublet lens assemblies have optical axes coaxial with the axes of the telescopes, and offset from the optical axis of the collimator assembly. Hence, the doublet lens assemblies collect light from a sub-diameter, decentered aperture of the collimator. The achromatic doublet lens assemblies correct axial chromatic aberration in the telescopes.

This invention provides a compact, lightweight, low cost night vision goggle with minimum axial chromatic aberration and off-axis vignetting, yet a goggle which also has a simplified, two-lens afocal telescope optical system.

BRIEF DESCRIPTION OF THE DRAWINGS

FIG. 3 is a front elevational view of the frame for the pair of achromatic doublet lens assemblies of this invention;

FIG. 4 is a cross-sectional view of the frame of FIG. 3, taken along line 4—4 in FIG. 3; and FIG. 5 is an exploded schematic view, on an enlarged scale, of the collimator and afocal telescope portion of the optical system of the goggle of FIG. 1, illustrating the path of principal light rays through the optical system.

Figure 1:
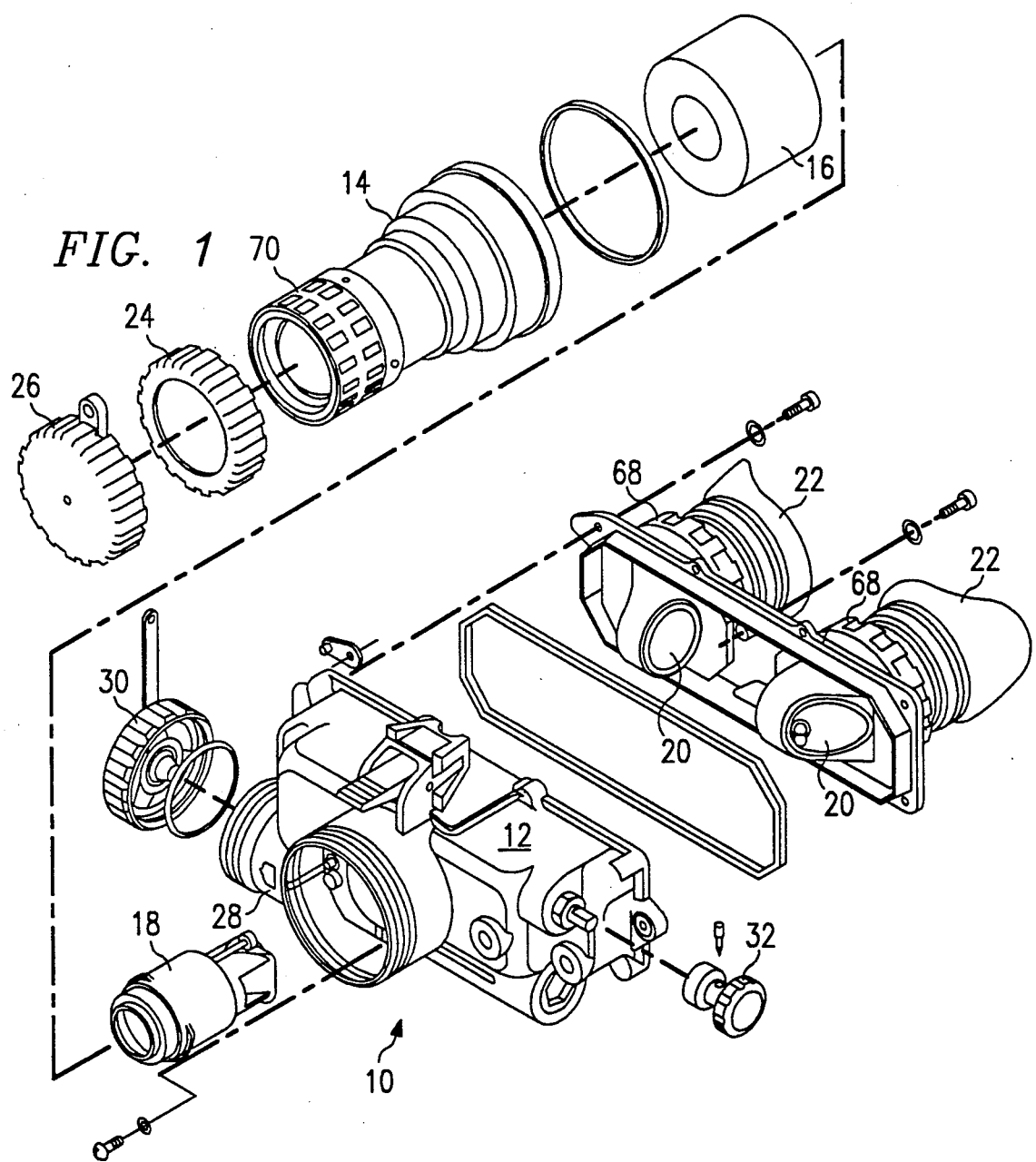
FIG. 1 is an exploded view of the improved night vision goggle of this invention.

DETAILED DESCRIPTION OF THE PREFERRED EMBODIMENT:

The preferred embodiment of the present invention and its advantages are best understood by referring to the drawings, like numerals being used for like and corresponding parts of the various drawings.

Referring now to the drawings, and more particularly to FIG. 1, there is shown an improved binocular night vision goggle, generally designated 10, which incorporates the preferred embodiment of the present invention.

As illustrated in FIG. 1, goggle 10 comprises a housing 12 which contains or supports on its front side an objective lens assembly 14, an image intensifier tube 16, and a collimator assembly 18. The rear portion of the housing 12 supports a pair of afocal telescopes 20 and associated eyecups 22. The objective lens assembly 14 is protected by a sacrificial window 24 and a lens cap 26. The housing contains on its side a battery compartment 28 which is closed by a battery cap 30. The housing is also provided with a switch 32 for energizing and de-energizing the goggle electronic circuitry (not shown).

Figure 2:
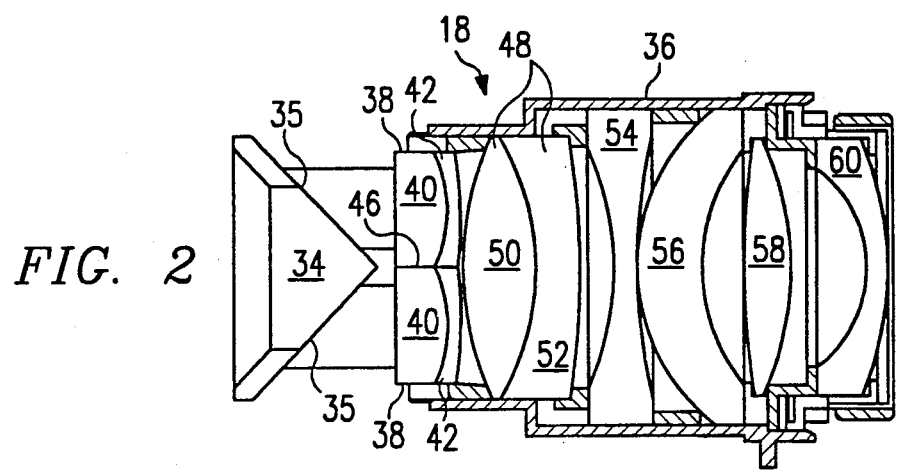
FIG. 2 is a cross-sectional view of the collimator assembly and image splitter of the goggle in FIG. 1, taken along the longitudinal axis thereof.

Referring now to FIG. 2, the goggle of this invention also includes a splitter member 34 having mirrors 35 which reflect an image viewed by the collimator to each of the afocal telescopes 20. As also seen in FIG. 2, the collimator assembly 18 comprises a collimator housing 36 which houses a plurality of lenses which are more fully described hereinafter. At the left end of the collimator assembly 18 is a pair of achromatic doublet lens assemblies 38. Each achromatic doublet lens assembly 38 is a cemented doublet which comprises a positive meniscus or concavo-convex lens 40 and a negative meniscus or convexo-concave lens 42. Lenses 40 and 42 are cemented together with a suitable optical adhesive. As best seen in FIG. 3, the achromatic doublet lens assemblies 38 are positioned side-by-side in a single, externally annular frame 44. (Shown in cross-section in FIG. 2.) The lens assemblies 38 have adjoined edges 46, which are aligned with the optical axis of the collimator assembly 18. The lens assemblies 38 are preferably achromized for the colors green and yellow, and for the wavelengths 516 nm and 604 nm, and may be composed of either optical glass or optical plastic. Lens 40 is preferably made from Schott LaFN 21 optical glass ($n_d = 1.788$, $v_d = 47.2$). Lens 42 is preferably made from Schott SFL56 optical glass ($n_d = 1.785$, $v_d = 26.1$). The optical power of lens assemblies 38 is preferably zero, but may range from approximately $-0.05$ to $+0.05$. As best seen in FIG. 2, the achromatic doublet lens assemblies 38 have optical axes which are offset from the optical axis of the collimator assembly 18, but are aligned with the optical axis of a respective afocal telescope.

Referring again to FIG. 2, the collimator assembly 18 contains, on the entrance side of the lens assemblies 38, a cemented doublet 48 consisting of a double-convex lens 50 and a convexo-concave lens 52. On the entrance side of the cemented doublet 48 is a double-concave lens 54. On the entrance side of the double-concave lens 54 is a second convexo-concave lens 56. On the entrance side of the second convexo-concave lens is a second double-convex lens 58. Finally, the collimator assembly 18 contains, on the entrance side of the second double-convex lens 58, a third convexo-concave lens 60.

FIG. 5 schematically illustrates the portion of the optical system of the night vision goggle 10 which includes the fiber optic output spherical surface 17 of image intensifier tube 16, collimator assembly 18, splitter member 34, and one of the afocal telescopes 20. Each afocal telescope 20 optically comprises an aspheric singlet objective lens 62, an aspheric singlet eyepiece lens 64, and a mirror 66. A protective window 67 may be located on the exit side of eyepiece lens 64. Mirror 66 is mounted optically between objective lens 62 and eyepiece lens 64 for reflecting an image viewed by objective lens 62 to eyepiece lens 64. Objective lens 62 and eyepiece lens 64 are substantially identical optically, but are mounted in optically opposite directions within afocal telescopes 20.

The improved binocular night vision goggle 10 of this invention operates as follows: The objective lens assembly 14 collects low intensity light from a scene and transmits it to image intensifier tube 16. Tube 16 intensifies the light received from objective lens assembly 14 and transmits the intensified light to the collimator assembly 18. Collimator assembly 18 collimates the light and transmits it to the pair of achromatic doublet lens assemblies 38. Lens assemblies 38 each collect light from a sub-diameter, decentered aperture of the lenses in collimator assembly 18, and transmit the light to splitter member 34. Mirrors 35 of splitter member 34 reflect the light transmitted by lens assemblies 38 to objective lenses 62 within afocal telescopes 20. Mirrors 66 within telescopes 20 reflect the light to eyepiece lenses 64, which transmit the intensified image viewed by the objective lens assembly 14 to the eyes of the viewer.

As seen in FIG. 5, the optical axes of the achromatic doublet lens assemblies 38 are offset, or decentered, from the optical axis of collimator assembly 18, but are coaxial with the optical axes of the afocal telescopes. This coaxial alignment permits lens assemblies 38 to correct the axial chromatic aberration in telescopes 20, even though lens assemblies 38 are not physically located within afocal telescopes 20, but within collimator assembly housing 36.

It should also be observed that each lens assembly 38 is located optically at the entrance pupil of one of the afocal telescopes 20. Location at the entrance pupil permits lens assembly 38 to have minimum size and weight, and also minimizes off-axis vignetting associated with the lenses in collimator assembly 18.

Eyepiece lenses 64 of afocal telescopes 20 are mounted for limited axial displacement within housing 12, and are separately adjustable therein by rotation of adjusting rings 68, as seen in FIG. 1. Rotation of a ring 68 adjusts the focus of the associated telescope over a predetermined range. Similarly, objective lens assembly 14 is also mounted for limited axial displacement within housing 12, and is adjustable therein by rotation of adjusting ring 70, which adjusts the focus thereof over a predetermined range. In addition, each of the afocal telescopes 20 is slidably mounted within housing 12 to permit individual lateral adjustment of interpupillary distance. The slidable mounting of the telescopes 20 is well known to those skilled in the art as described and illustrated in U.S. Pat. No. 4,463,252 issued Jul. 31, 1984 to Brennan, et al. for a Night Vision Goggle System.

The improved night vision goggle of this invention may optionally include a face mask or head gear for supporting the goggle from the head of a user, and for permitting the user to view objects through the goggle while having free use of both hands. Such a face mask is illustrated in the above-referenced Brennan patent. The face mask may also be provided with an adjustable strap assembly and a quick-release connection designed to removably mount the goggle to the face mask. A head gear for use with the goggle is described in U.S. Pat. No. 4,463,252, issued Jul. 31, 1984 to Brennan, et al.

The binocular night vision goggle of the present invention, and many of its intended advantages, will be understood from the foregoing description and it will be apparent that, although the invention and its advantages have been described in detail, various changes, substitutions, and alterations may be made in the manner, procedure, and details thereof without departing from the spirit and scope of the invention, as defined by the appended claims, or sacrificing all of its material advantages, the form hereinbefore described being merely a preferred or exemplary embodiment thereof.

What is claimed is:

1. A night vision goggle, comprising:
   a housing;
   a collimator assembly, supported within the housing, having an optical axis;
   a pair of afocal telescopes, supported within the housing, each of the telescopes having an aspheric singlet objective lens, an aspheric singlet eyepiece lens, and a mirror mounted between the objective lens and the eyepiece lens, each of the telescopes also having an entrance pupil, an exit pupil, and an optical axis offset from the optical axis of the collimator, for transmitting images separately to each eye of a viewer;
   a splitter member, mounted within the housing concentrically with the optical axis of the collimator assembly and located optically between the collimator assembly and each telescope, for reflecting an image viewed by the collimator to each of the telescopes;
   an objective lens assembly, supported within the housing, for transmitting an image incident thereon to the collimator assembly;
   an image intensifier tube, located between the objective lens assembly and the collimator assembly, for intensifying an image viewed by the objective lens assembly before its transmittal to the collimator assembly; and
   a pair of achromatic doublet lens assemblies, each doublet lens assembly mounted within the housing near the entrance pupil of a telescope and with its optical axis coaxial with the axis of the telescope, each doublet lens assembly being a cemented doublet with approximately zero optical power, for collecting light from a sub-diameter, decentered aperture of the collimator, and for correcting the axial chromatic aberration of the afocal telescope with which it is optically associated.

2. The night vision goggle of claim 1, wherein the achromatic doublet lens assemblies are positioned side-by-side and have adjoined edges, the adjoined edges being aligned with the optical axis of the collimator.

3. The night vision goggle of claim 1, wherein each achromatic doublet lens assembly is achromized for the colors green and yellow, and for the wavelengths 516 nm and 604 nm.

4. The night vision goggle of claim 1, wherein the aspheric singlet objective lens and the aspheric singlet eyepiece lens of the afocal telescopes are substantially optically identical, but are mounted in optically opposite directions within each afocal telescope.

5. The night vision goggle of claim 1, wherein the eyepiece lens of each telescope is mounted for limited axial displacement within the housing by rotation of an adjusting ring, for adjusting the focus of the telescope over a predetermined range.

6. The night vision goggle of claim 1, wherein each of said afocal telescopes is slidably mounted within the housing, for individual lateral adjustment of interpupillary distance.

7. The night vision goggle of claim 1, wherein the objective lens assembly is mounted for limited axial displacement within the housing by rotation of an adjusting ring, for adjusting the focus thereof over a predetermined range.

8. The night vision goggle of claim 1, wherein the image intensifier tube includes a glass input window having a flat input surface facing toward the objective lens assembly and a fiber optic output having a concave output surface facing toward the collimator assembly.

9. The night vision goggle of claim 1, wherein the collimator assembly comprises:
   a cemented doublet consisting of a double-convex lens and a convexo-concave lens;
   a double-concave lens located on the entrance side of the cemented doublet;
   a second convexo-concave lens located on the entrance side of the double-concave lens;
   a second double-convex lens located on the entrance side of the second convexo-concave lens; and
   a third convexo-concave lens located on the entrance side of the second double-convex lens.

10. The night vision goggle of claim 1, wherein a source of power to energize the image intensifier tube is a battery replaceably disposed within the housing.

11. The night vision goggle of claim 1, further including a face mask for supporting the optical system housing from the head of a user, and for permitting the user to view objects through the optical system while having free use of both hands.

12. The night vision goggle of claim 11, wherein the face mask has an adjustable strap assembly and a connection designed to removably mount the optical system housing to the face mask.

13. The night vision goggle of claim 12, wherein the connection is of a quick-release type, and wherein the strap assembly is adjustable by means of a plurality of fasteners securing the strap assembly to the face mask.

* * * * *